US012583357B2

(12) United States Patent
Hayashi et al.

(10) Patent No.: US 12,583,357 B2
(45) Date of Patent: Mar. 24, 2026

(54) MANAGEMENT APPARATUS, MANAGEMENT METHOD AND COATING PROCESSING FACILITY

(71) Applicant: Taikisha Ltd., Tokyo (JP)

(72) Inventors: Yoshikazu Hayashi, Sagamihara (JP); Hidehisa Yoshioka, Sagamihara (JP)

(73) Assignee: Taikisha Ltd., Tokyo (JP)

( * ) Notice: Subject to any disclaimer, the term of this patent is extended or adjusted under 35 U.S.C. 154(b) by 124 days.

(21) Appl. No.: 18/510,267

(22) Filed: Nov. 15, 2023

(65) Prior Publication Data

US 2024/0198850 A1    Jun. 20, 2024

(30) Foreign Application Priority Data

Dec. 16, 2022    (JP) ................................. 2022-201470

(51) Int. Cl.
  *G05D 1/00*      (2024.01)
  *B60L 58/12*     (2019.01)
(52) U.S. Cl.
  CPC ............ *B60L 58/12* (2019.02); *G05D 1/0088* (2013.01)
(58) Field of Classification Search
  None
  See application file for complete search history.

(56) References Cited

U.S. PATENT DOCUMENTS 6,498,454 B1 * 12/2002 Pinlam .................. H01M 10/44
                                                              320/107
11,364,962 B2    6/2022 Von Krauland <table>
<tr><td>2014/0172196</td><td>A1 *</td><td>6/2014</td><td>Hayashi</td><td>................... B60L 53/65</td></tr>
<tr><td></td><td></td><td></td><td></td><td>701/2</td></tr>
<tr><td>2016/0266578</td><td>A1 *</td><td>9/2016</td><td>Douglas</td><td>............... G05D 1/0282</td></tr>
<tr><td>2017/0101026</td><td>A1 *</td><td>4/2017</td><td>Lucea</td><td>..................... B60L 58/10</td></tr>
<tr><td>2020/0171548</td><td>A1 *</td><td>6/2020</td><td>Li</td><td>............................. B07C 5/36</td></tr>
<tr><td>2020/0216130</td><td>A1 *</td><td>7/2020</td><td>Von Krauland</td><td>....... B62D 65/18</td></tr>
<tr><td>2022/0073156</td><td>A1</td><td>3/2022</td><td>Lauer et al.</td><td></td></tr>
<tr><td>2022/0111739</td><td>A1 *</td><td>4/2022</td><td>Sugimoto</td><td>............... B60L 58/13</td></tr>
<tr><td>2023/0034616</td><td>A1 *</td><td>2/2023</td><td>Alsleben</td><td>.............. G01R 31/392</td></tr>
<tr><td>2023/0304813</td><td>A1 *</td><td>9/2023</td><td>Girard</td><td>..................... B60L 58/12</td></tr>
<tr><td>2023/0315118</td><td>A1 *</td><td>10/2023</td><td>Saimen</td><td>............ G06Q 10/06315</td></tr>
<tr><td></td><td></td><td></td><td></td><td>701/25</td></tr>
</table>

FOREIGN PATENT DOCUMENTS

<table>
<tr><td>CN</td><td>110750098 A</td><td>*</td><td>2/2020</td><td>............. G05D 1/024</td></tr>
<tr><td>JP</td><td>2020-524109 A</td><td></td><td>8/2020</td><td></td></tr>
<tr><td>JP</td><td>2022-517314 A</td><td></td><td>3/2022</td><td></td></tr>
<tr><td>JP</td><td>7185079 B1</td><td>*</td><td>12/2022</td><td></td></tr>
</table>

* cited by examiner

*Primary Examiner* — Davin Seol
(74) *Attorney, Agent, or Firm* — Modal PLLC

(57) ABSTRACT

A management apparatus manages driving of a plurality of automated guided vehicles that convey a conveyance target object in a production facility. The apparatus acquires remaining amount information of a battery provided in a selected vehicle selected from the plurality of automated guided vehicles, acquires a conveyance condition of a conveyance target object, the conveyance condition including a condition for specifying a conveyance destination, estimates, based on the remaining amount information and the conveyance condition, a remaining amount of the battery at the time of conveying the conveyance target object to the conveyance destination, and decides a driving mode of the selected vehicle based on an estimation result of the estimation unit.

12 Claims, 10 Drawing Sheets

F I G. 1
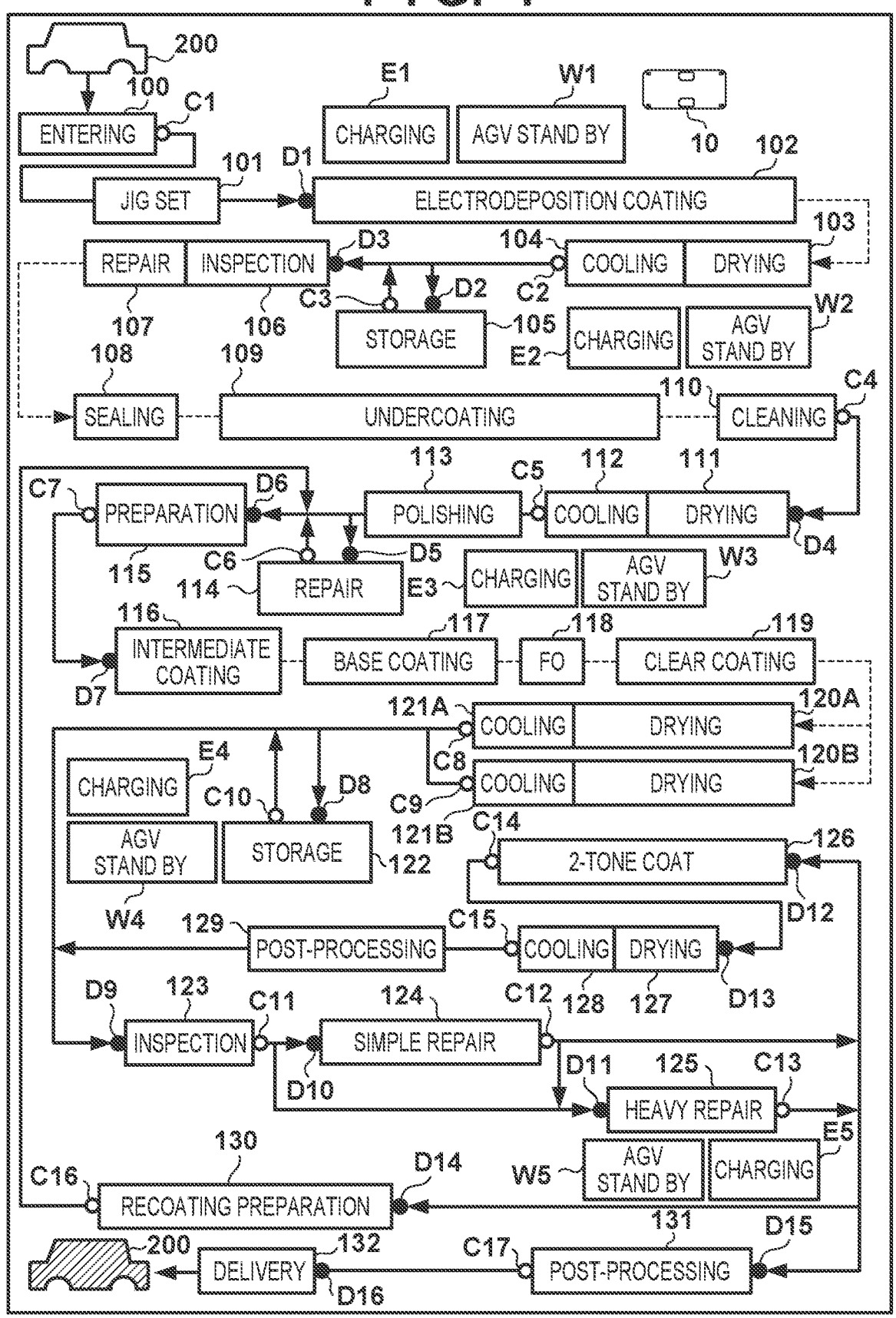

F I G. 4A

| ID | STANDBY AREA | REMAINING BATTERY AMOUNT | STATUS |
|---|---|---|---|
| V01 | W1 | 60% | STANDING BY |
| V02 | W2 | 40% | CONVEYING |
| ... | ... | ... | ... |

F I G. 4B

| START POINT | END POINT | DISTANCE | HIGH-TEMPERATURE AREA |
|---|---|---|---|
| C1 | D1 | ××m | ABSENCE |
| ... | ... | ... | ... |
| C5 | D6 | ○○m | PRESENCE(Δ°C) |
| ... | ... | ... | ... |

F I G. 4C

| STANDBY AREA | START POINT | DISTANCE |
|---|---|---|
| W1 | C1 | △△m |
| W2 | C1 | ○△m |
| ... | ... | ... |
| ... | ... | ... |

F I G. 5
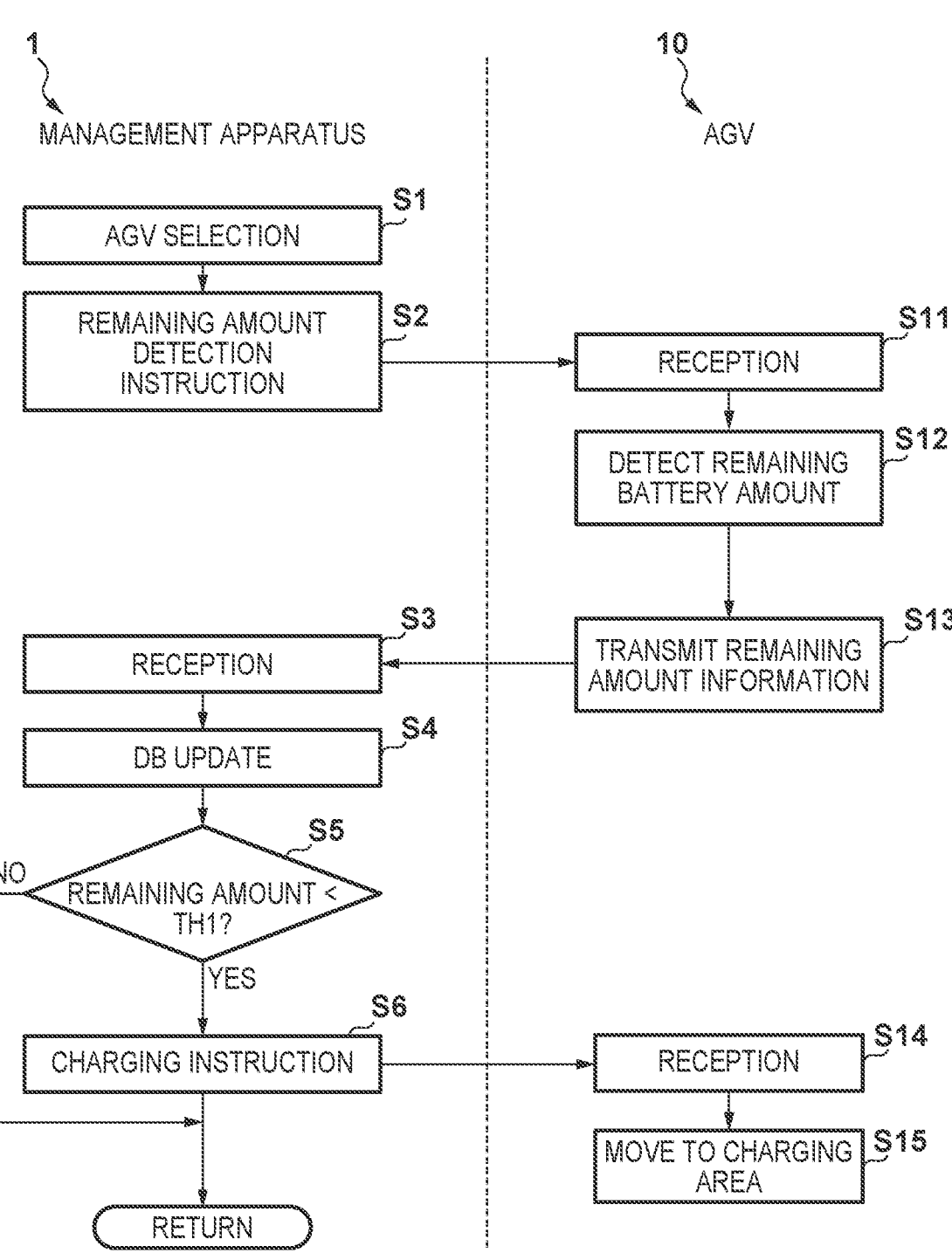

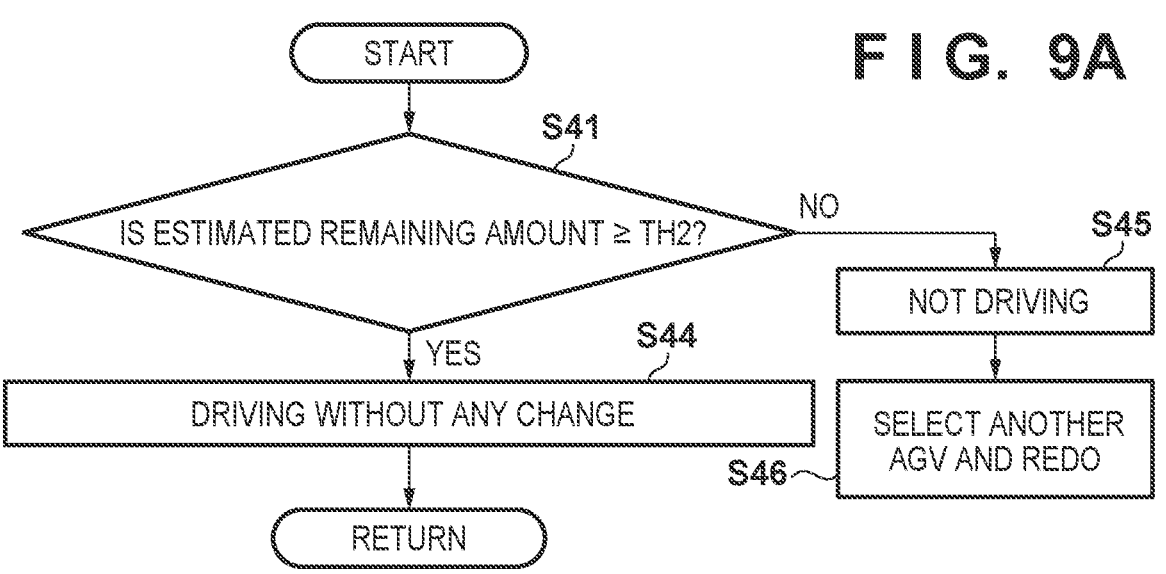
F I G. 9A
START
S41
IS ESTIMATED REMAINING AMOUNT ≥ TH2?
NO
S45
NOT DRIVING
YES
S44
DRIVING WITHOUT ANY CHANGE
S46
SELECT ANOTHER AGV AND REDO
RETURN
F I G. 9B
START
S41
IS ESTIMATED REMAININGAMOUNT ≥ TH2?
NO
YES
S42
DRIVE WITHOUT CHARGING
S51
MAKE IT IN TIME CHARGING?
NO
S53
NOT DRIVING
YES
S52
DRIVING BY CHARGING
S54
SELECT ANOTHER AGV AND REDO
RETURN

MANAGEMENT APPARATUS, MANAGEMENT METHOD AND COATING PROCESSING FACILITY

CROSS-REFERENCE TO RELATED APPLICATION(S)

This application claims priority to and the benefit of Japanese Patent Application No. 2022-201470 filed on Dec. 16, 2022, the entire disclosure of which is incorporated herein by reference.

BACKGROUND OF THE INVENTION

Field of the Invention

The present invention relates to a driving management technique of an automated guided vehicle.

Description of the Related Art

There is known a technique using an automated guided vehicle to convey a conveyance target object in a production facility. Japanese Patent Laid-Open No. 2020-524109 discloses a technique using an automated guided vehicle (trackless transfer cart 28) to convey a vehicle body of a vehicle in a coating facility of the vehicle body. In addition, Japanese Patent Laid-Open No. 2022-517314 discloses a technique in which a charging area is provided in a production facility and the battery of an automated guided vehicle (vehicle 100) is charged in the charging area.

If a battery enters an overdischarge state, the battery degrades rapidly. Even if, at the start of conveyance, there is a remaining battery amount enough to convey an automated guided vehicle to a conveyance destination, if the battery enters the overdischarge state at the conveyance destination, the life of the battery decreases, and the frequency of replacing the battery by a new battery becomes high.

SUMMARY OF THE INVENTION

The present invention has as its object to provide a technique capable of reducing the replacement frequency of the battery of an automated guided vehicle.

According to an aspect of the present invention, there is provided a management apparatus for managing driving of a plurality of automated guided vehicles that convey a conveyance target object in a production facility, comprising: a remaining amount information acquisition unit configured to acquire remaining amount information of a battery provided in a selected vehicle selected from the plurality of automated guided vehicles; a conveyance condition acquisition unit configured to acquire a conveyance condition of a conveyance target object, the conveyance condition including a condition for specifying a conveyance destination; an estimation unit configured to estimate, based on the remaining amount information and the conveyance condition, a remaining amount of the battery at the time of conveying the conveyance target object to the conveyance destination; and a decision unit configured to decide a driving mode of the selected vehicle based on an estimation result of the estimation unit.

Further features of the present invention will become apparent from the following description of exemplary embodiments (with reference to the attached drawings).

BRIEF DESCRIPTION OF THE DRAWINGS

FIG. 1 is a layout view showing an example of a production facility to which the present invention is applicable;

FIG. 4A is a table showing an example of information accumulated in an AGV management database;

FIGS. 4B and 4C are tables each showing an example of information accumulated in a conveyance path database;

FIG. 5 is a flowchart illustrating an example of processing of a management apparatus;

FIGS. 9A and 9B are flowcharts each illustrating an example of the processing of the management apparatus.

DESCRIPTION OF THE EMBODIMENTS

Figure 2A:
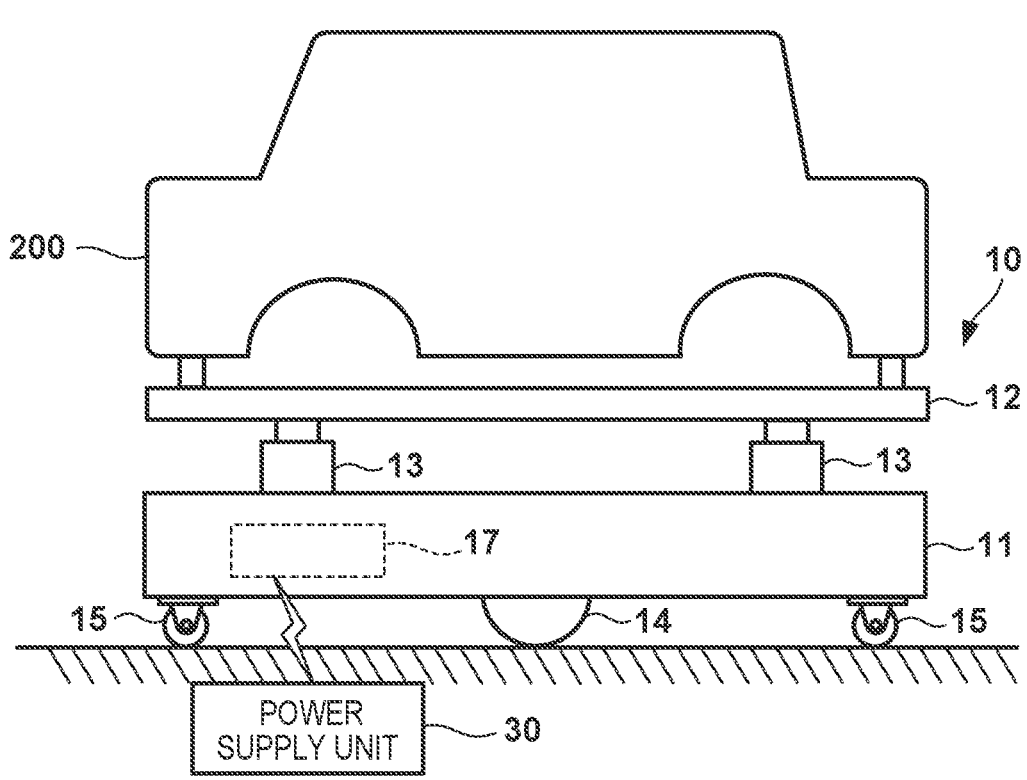
FIGS. 2A and 2B are explanatory views of an automated guided vehicle.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

<Overview of Production Facility>

FIG. 1 is a layout view showing an example of a production facility to which the present invention is applicable. The example of FIG. 1 shows a coating processing facility of a vehicle body 200 of a vehicle, which includes a plurality of areas 101 to 132 where works are performed. In FIG. 1, arrows each connecting the areas indicate the conveyance order of the vehicle body 200 as a conveyance target object. A solid line represents the conveyance path of the vehicle body 200 by an Automated Guided Vehicle (AGV) 10 and a broken line represents the conveyance path of the vehicle body 200 by a conveyer (not shown). Each of AGV standby areas W1 to W5 (to be generically referred to as standby areas W hereinafter) is an area where the AGV 10 is arranged in a conveyance standby state. One standby area W has such an area that a plurality of AGVs 10 can stand by. Each of charging areas E1 to E5 (to be generically referred to as charging areas E hereinafter) is an area for charging the battery of the AGV 10, in which a charging facility is provided.

The work order of the works in the respective areas will be described. In an entering area 100, the uncoated vehicle body 200 is entered from a previous step. The vehicle body 200 is conveyed from the entering area 100 to the electrodeposition coating area 102 via the jig set area 101. In the jig set area 101, an operator sets, in the vehicle body 200, a jig necessary for following coating processing in a state in which the vehicle body 200 is mounted on the AGV 10. In the electrodeposition coating area 102, a conveyer that conveys the vehicle body 200, a preprocessing facility of electrodeposition coating, and an electrodeposition coating facility are provided, and the vehicle body 200 is electrode-position-coated.

The vehicle body 200 is conveyed from the electrodeposition coating area 102 to the drying area 103 and the cooling area 104. In the drying area 103, a drying facility of the vehicle body 200 is provided, and heats the vehicle body 200 to dry the electrodeposition coating. In the cooling area 104, a cooling facility of the vehicle body 200 is provided, and cools the vehicle body 200 heated in the drying area 103. An area around the drying area 103 and the cooling area 104 is a high-temperature area where the temperature is relatively higher than in other areas of the production facility due to the influence of heat generation in the drying area 103.

The vehicle body 200 is conveyed from the cooling area 104 to the storage area 105 or the inspection area 106. The storage area 105 is an area where the electrodeposition-coated vehicle body 200 is temporarily stored, and a plurality of vehicle bodies 200 can be stored. The stored vehicle body 200 is conveyed to the inspection area 106. In the inspection area 106, the electrodeposition coating is inspected. The inspection can be performed by an operator or an inspection apparatus. In the repair area 107 following the inspection area 106, the electrodeposition coating is repaired based on an inspection result.

In the sealing area 108, as preprocessing of undercoating of the vehicle body 200, a work of filling an edge portion and the like of the vehicle body 200 with a filler is performed. The vehicle body 200 is conveyed from the sealing area 108 to the undercoating area 109. In the undercoating area 109, masking, undercoating, masking removal, and the like for the back surface of the floor of the vehicle body 200 are performed. The vehicle body 200 is conveyed from the undercoating area 109 to the cleaning area 110, and is then cleaned.

The vehicle body 200 is conveyed from the cleaning area 110 to the drying area 111 and the cooling area 112. In the drying area 111, a drying facility of the vehicle body 200 is provided, and heats the vehicle body 200 to dry the filler filled in the sealing area 108. In the cooling area 112, a cooling facility of the vehicle body 200 is provided, and cools the vehicle body 200 heated in the drying area 111. An area around the drying area 111 and the cooling area 112 is a high-temperature area where the temperature is relatively higher than in other areas of the production facility due to the influence of heat generation in the drying area 111.

The vehicle body 200 is conveyed from the cooling area 112 to the repair area 114 or the preparation area via the polishing area 113. In the polishing area 113, a polishing work of removing dust and the like on the surface of the electrodeposition coating is performed in a state in which the vehicle body 200 is mounted on the AGV 10. If the state of the surface of the electrodeposition coating is not improved by polishing, the vehicle body 200 is conveyed to the repair area 114 and repaired. In the preparation area 115, for example, the surface of the vehicle body 200 is cleaned.

The vehicle body 200 is conveyed from the preparation area 115 to the intermediate coating area 116 and the base coating area 117 sequentially. In each of the intermediate coating area 116 and the base coating area 117, a coating booth is provided, and the vehicle body 200 is intermediate-coated or base-coated. The coated vehicle body 200 is conveyed to the flash-off (FO) area 118. This embodiment assumes the use of a water-based paint, and processing of drying out water from the water-based paint with which the vehicle body 200 is coated is performed in the FO area 118. Subsequently, the vehicle body 200 is conveyed to the clear coating area 119. In the clear coating area 119, a coating booth is provided, and the vehicle body 200 is clear coated.

The vehicle body 200 is conveyed from the clear coating area 119 to the drying area 120A and the cooling area 121A or the drying area 120B and the cooling area 121B. In each of the drying areas 120A and 120B, a drying facility of the vehicle body 200 is provided, and heats the vehicle body 200 to dry the topcoat. In each of the cooling areas 121A and 121B, a cooling facility of the vehicle body 200 is provided, and cools the vehicle body 200 heated in the drying area 120A or 120B. An area around the drying area 120A or 120B and the cooling area 121A or 121B is a high-temperature area where the temperature is relatively higher than in other areas of the production facility due to the influence of heat generation in the drying area 120A or 120B.

The vehicle body 200 is conveyed from the cooling area 121A or 121B to the storage area 122 or the inspection area 123. The storage area 122 is an area where the topcoated vehicle body 200 is temporarily stored, and a plurality of vehicle bodies 200 can be stored. The stored vehicle body 200 is conveyed to the inspection area 123. In the inspection area 123, the topcoat is inspected. The inspection can be performed by an operator or an inspection apparatus. Based on an inspection result in the inspection area 123, the vehicle body 200 is conveyed to the simple repair area 124 or the heavy repair area 125. In the simple repair area 124, relatively simple repair of the topcoat is performed. In the heavy repair area 125, relatively heavy repair is performed. If the repair in the simple repair area 124 is insufficient, the vehicle body 200 is conveyed to the heavy repair area 125 and is repaired.

The vehicle body 200 is conveyed from the simple repair area 124 or the heavy repair area 125 to the 2-tone coat area 126, the recoating preparation area 130, or the post-processing area 131. If the topcoat of the vehicle body 200 has a defect that cannot be repaired, the vehicle body 200 is conveyed to the recoating preparation area 130, and is then conveyed to the preparation area 115. In the recoating preparation area 130, polishing of the coating or the like is performed. If the topcoat of the vehicle body 200 is a 2-tone coat, the vehicle body 200 is conveyed to the 2-tone coat area 126.

In the 2-tone coat area 126, masking and coating in a coating booth are performed. After that, the vehicle body 200 is conveyed to the drying area 127 and the cooling area 128. In the drying area 127, a drying facility of the vehicle body 200 is provided, and heats the vehicle body 200 to dry the 2-tone coat. In the cooling area 128, a cooling facility of the vehicle body 200 is provided, and cools the vehicle body 200 heated in the drying area 127. An area around the drying area 127 and the cooling area 128 is a high-temperature area where the temperature is relatively higher than in other areas of the production facility due to the influence of heat generation in the drying area 127. The vehicle body 200 is conveyed from the cooling area 128 to the inspection area 123 via the post-processing area 129 to inspect the 2-tone coat. In the post-processing area 129, a work of removing the masking or the like is performed in a state in which the vehicle body 200 is mounted on the AGV 10.

Post-processing after topcoating is performed in the post-processing area 131. For example, various kinds of works such as a work of burying a plug in a floor hole formed for electrodeposition coating, a work of coating part of the vehicle body 200 in black, and a work of eliminating rust in a hollow part of the vehicle body 200 are performed. After the post-processing, the vehicle body 200 is conveyed to the delivery area 132, and delivered to the next step (for example, an assembly step).

<Conveyance Path of AGV>

The conveyance path of the vehicle body 200 by the AGV 10 will be described. Referring to FIG. 1, each of start points C1 to C17 (to be generically referred to as start points C hereinafter) represented by "○" is the conveyance start point (conveyance source) of the vehicle body 200 by the AGV 10, at which the vehicle body 200 is transferred to the AGV 10. Each of end points D1 to D16 (to be generically referred to as end points D hereinafter) represented by "•" is the conveyance end point (conveyance destination) of the vehicle body 200 by the AGV 10, at which the vehicle body 200 is transferred from the AGV 10 to the conveyer or the like. When conveying the vehicle body 200, the AGV 10 moves through a path of "standby area W→start point C→end point D→standby area W".

Each start point C corresponds to the specific end point D, thereby defining the conveyance path of the vehicle body 200 (the moving path of the AGV 10), particularly, a conveyance section of one unit. The start point C1 corresponds to the end point D1. The start point C2 corresponds to the end points D2 and D3. The start point C3 corresponds to the end point D3. The start point C4 corresponds to the end point D4, and there is a high-temperature area caused by the drying area 111 in this conveyance path. The start point C5 corresponds to the end points D5 and D6, and there is a high-temperature area caused by the drying area 111 in this conveyance path. The start point C6 corresponds to the end point D6.

The start point C7 corresponds to the end point D7. The start points C8 and C9 correspond to the end points D8 and D9, and there is a high-temperature area caused by the drying area 120A or 120B in this conveyance path. The start point C10 corresponds to the end point D9. The start point C11 corresponds to the end points D10 and D11. The start point C12 corresponds to the end points D11, D12, D14, and D15. The start point C13 corresponds to the end points D12, D14, and D15.

The start point C14 corresponds to the end point D13, and there is a high-temperature area caused by the drying area 127 in this conveyance path. The start point C15 corresponds to the end point D9, and there is a high-temperature area caused by the drying area 127 in this conveyance path. The start point C16 corresponds to the end point D6. The start point C17 corresponds to the end point D16.

Example of Arrangement of AGV

Figure 2B:
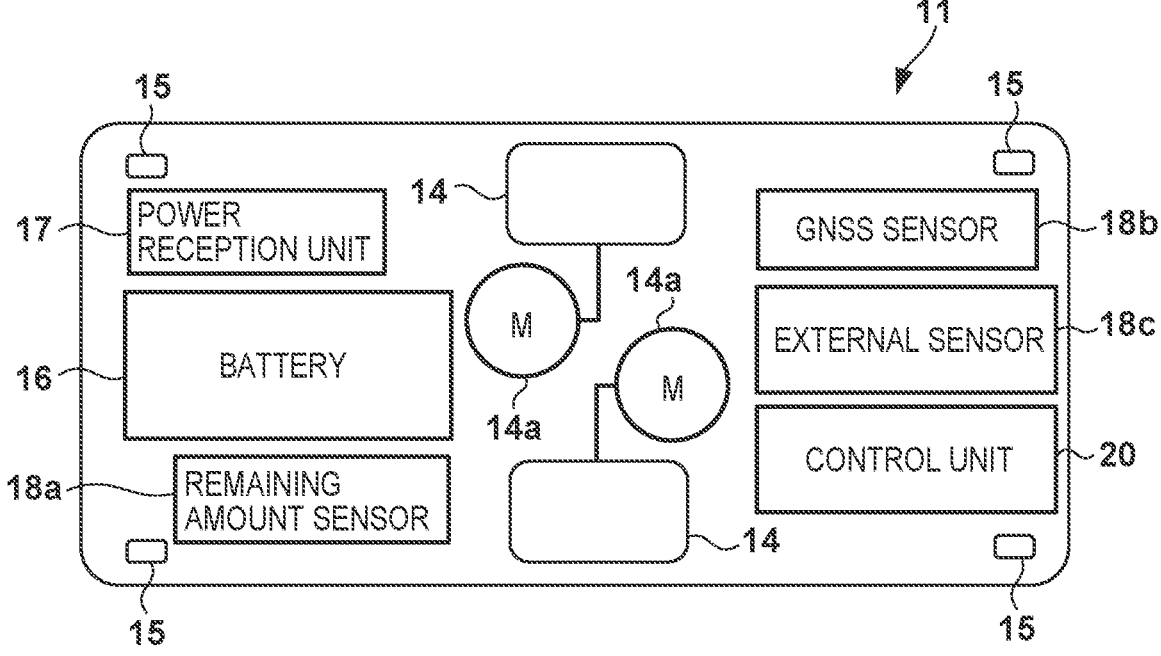

FIGS. 2A and 2B are explanatory views showing an example of the arrangement of the AGV 10. FIG. 2A is a side view of the AGV 10, and FIG. 2B is a plan view schematically showing the internal structure of a travel unit 11.

The AGV 10 includes the travel unit 11, a support unit 12 that supports the vehicle body 200, and a plurality of lifting units 13 that moves the support unit 12 upward and downward with respect to the travel unit 11. The plurality of lifting units 13 are, for example, electric cylinders, and are synchronously driven to move the support unit 12 upward and downward at the time of transfer of the vehicle body 200.

The travel unit 11 includes a pair of left and right drive wheels 14, and each drive wheel 14 is driven by a corresponding motor 14a as a driving source. Free wheels 15 are arranged at the four corners of the travel unit 11. The travel unit 11 can advance straight and turn by driving the drive wheels 14 by the motors 14a, and the AGV 10 is a trackless autonomous vehicle.

In the travel unit 11, a battery 16 is provided as the power source of the AGV 10. The battery 16 is, for example, a lithium-ion battery. The battery 16 can be charged by a power reception unit 17. In this embodiment, the battery 16 can be charged by a contactless charging method. A power supply unit 30 is installed in the floor of the charging area E. The battery 16 of the AGV 10 stopping in the charging area E is charged by wireless power transfer of the power reception unit 17 and the power supply unit 30. Note that the charging method of the battery 16 may be a contact charging method, and electrical connection terminals may be provided in the charging area E and the AGV 10 to contact each other.

The remaining amount of the battery 16 is detected by a remaining amount sensor 18a. The remaining amount sensor 18a is, for example, a voltage sensor and/or a current sensor. In this embodiment, the remaining amount of the battery 16 is a State Of Charge (SOC), and is specified by a percentage of 0 to 100%.

In the travel unit 11, a Global Navigation Satellite System (GNSS) sensor 18b and an external sensor 18c are provided. The GNSS sensor 18b can detect the current position of the AGV 10. The external sensor 18c includes one or a plurality of sensors that detect a target around the AGV 10. In a case where the moving path of the AGV 10 is defined by a line on the floor, the external sensor 18c includes a line sensor that optically or magnetically detects a line on the floor of the facility. Furthermore, the external sensor 18c can include, for example, an image sensor (camera) and an ultrasonic sensor. A control unit 20 is an electric circuit that controls the operation of the AGV 10, and details thereof will be described later.

<System>

Figure 3:
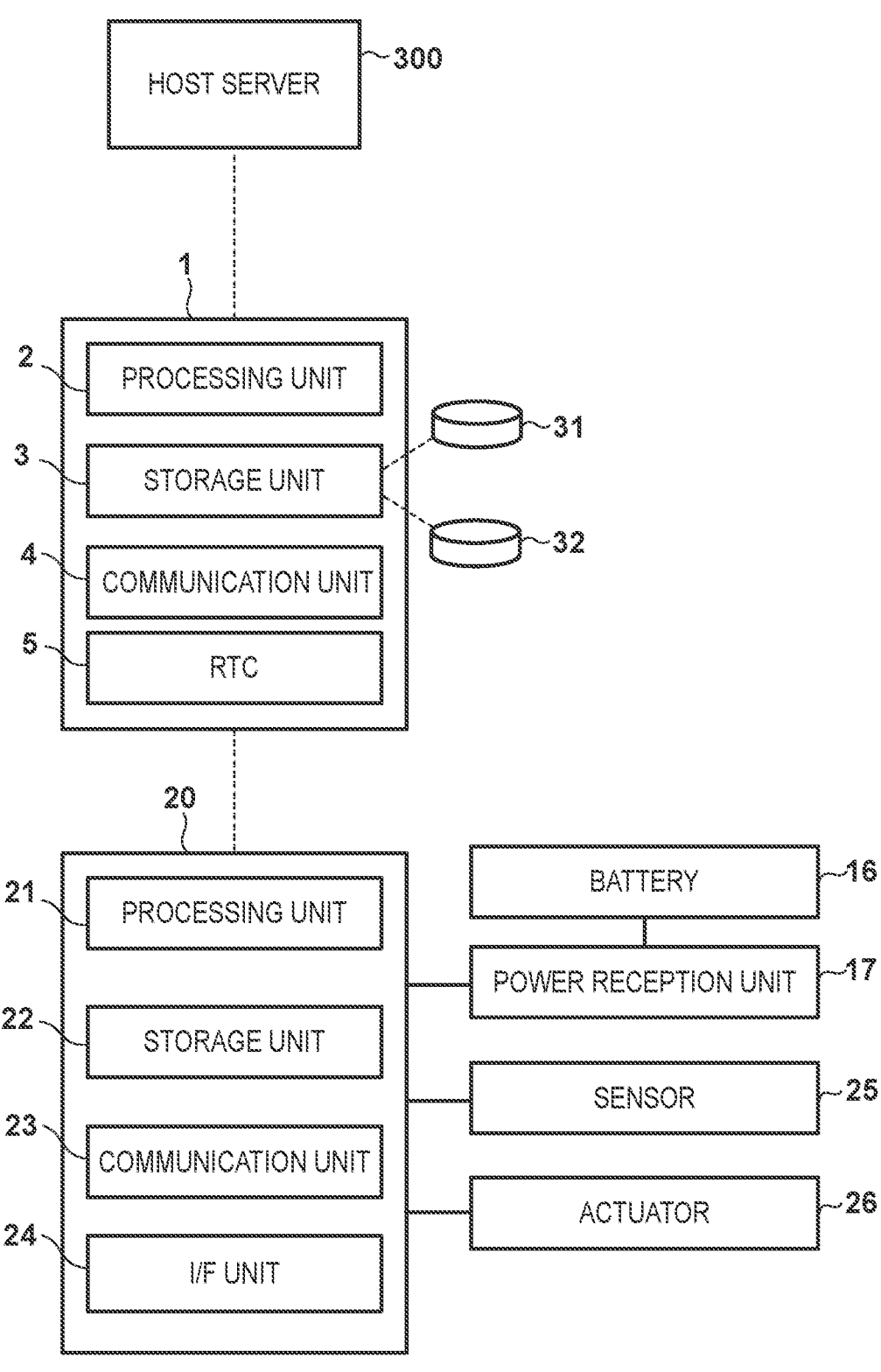
FIG. 3 is a block diagram of a control system of the production facility shown in FIG. 1.

FIG. 3 is a block diagram showing a control system in the production facility shown in FIG. 1, and is specifically a block diagram of an arrangement concerning driving control of the AGV 10. The system includes a host server 300 and a management apparatus 1, and the management apparatus 1 manages a plurality of AGVs 10 provided in the production facility. Note that FIG. 3 shows the control unit 20 of one AGV 10 for the sake of convenience.

The host server 300 is a server computer that controls the overall production facility, and issues an instruction to the management apparatus 1 or a facility installed in each area in accordance with a production plan.

The management apparatus 1 includes a processing unit 2, a storage unit 3, a communication unit 4, and a Real-Time Clock (RTC) 5. The processing unit 2 is a processor represented by a CPU, and executes a program stored in the storage unit 3. The storage unit 3 is formed by one or a plurality of storage devices such as a RAM, a ROM, and an HDD. The communication unit 4 includes a communication interface with the host server 300, and communicates with the host server 300 wirelessly or via a wire. The communication unit 4 further includes a wireless communication interface with the control unit 20 of the AGV 10. The RTC 5 is an IC that measures the time.

A storage unit 3 stores databases (DBs) 31 and 32. The DB 31 is an AGV management DB and the DB 32 is a conveyance path DB.

FIG. 4A shows an example of information accumulated in the AGV management DB 31. The AGV management DB 31 includes pieces of information of "standby area", "remaining battery amount", and "status" for each "ID" as an identifier for specifying each AGV 10. The "standby area" is information for specifying the standby area W as the home position of the corresponding AGV 10. In this embodiment, the AGV 10 basically moves from the standby area W as the home position at the time of conveying the vehicle body 200, and returns to the same standby area W after the conveyance. The "remaining battery amount" is information indicating the detection result of the remaining amount of the battery 16 of the corresponding AGV 10. The "status" is information indicating whether the corresponding AGV 10 currently stands by in the standby area W or performs the conveyance operation of the vehicle body 200.

FIG. 4B shows an example of information accumulated in the conveyance path DB 32. The conveyance path DB 32 accumulates information of the conveyance path of the vehicle body 200 by the AGV 10. In the example shown in FIG. 4B, for each conveyance section of one unit, pieces of information of "start point", "end point", "distance", and "high-temperature area" are included. The "start point" and the "end point" are pieces of information for specifying the start point C and the end point D of the corresponding conveyance section. The "distance" is information of the distance between the "start point" and the "end point", and represents a conveyance distance in the corresponding conveyance section. The "high-temperature area" is information indicating whether the corresponding conveyance section includes a high-temperature area. If a high-temperature area is included, temperature information (Celsius temperature) is also included. For example, referring to FIG. 1, the conveyance section from the start point C5 to the end point D6 includes the high-temperature area caused by the drying area 111, and thus "presence" is set in the "high-temperature area". FIG. 4C also shows an example of the information accumulated in the conveyance path DB 32. The information exemplified in FIG. 4C is information of a moving distance from the standby area W to the start point C.

Referring back to FIG. 3, the control unit 20 of the AGV 10 will be described. The control unit 20 includes a processing unit 21, the storage unit 22, a communication unit 23, and an input/output interface (I/F) unit 24. The processing unit 21 is a processor represented by a CPU, and executes a program stored in the storage unit 22 to control the overall AGV 10. The storage unit 22 is formed by one or a plurality of storage devices such as a RAM, a ROM, and an HDD. The communication unit 23 includes a wireless communication interface with the management apparatus 1. The processing unit 21 receives a detection result of a sensor 25 via the I/F unit 24, and outputs a control command to the power reception unit 17 or an actuator 26 via the I/F unit. The sensor 25 includes the remaining amount sensor 18a, the GNSS sensor 18b and the external sensor 18c, all of which are shown in FIG. 2B. The actuator 26 includes the motors 14a and the lifting units 13, all of which are shown in FIG. 2B.

Example of Processing of Management Apparatus

An example of processing executed by the processing unit 2 of the management apparatus 1 will be described. FIG. 5 shows an example of processing of monitoring the remaining amount of the battery 16 of each AGV 10, which is periodically executed for all the AGVs 10. Steps S1 to S6 are processes by the processing unit 2 of the management apparatus 1 and steps S11 to S15 are processes by the processing unit 21 of the control unit 20 of the AGV 10.

In step S1, the management apparatus 1 selects, from the AGVs 10 registered in the AGV management DB 31, the AGV 10 that exists in the standby area W and is to be monitored in this processing. In step S2, the management apparatus 1 transmits a remaining amount detection instruction of the battery 16 to the AGV 10 selected in step S1.

The control unit 20 receives the remaining amount detection instruction in step S11, and detects the remaining amount of the battery 16 by the remaining amount sensor 18a in step S12. In step S13, the control unit 20 transmits the detection result as remaining amount information to the management apparatus 1.

In step S3, the management apparatus 1 receives the remaining amount information. In step S4, the management apparatus 1 updates the "remaining battery amount" of the selected AGV 10 registered in the AGV management DB 31 based on the received remaining amount information. In step S5, it is determined whether the remaining battery amount indicated by the received remaining amount information is smaller than a lower limit threshold TH1. It is known that a battery such as a lithium-ion battery is desirably maintained to have remaining battery amount of 20% to 80%, and the life of the battery is shortened when the remaining battery amount is smaller than 20%. Therefore, the lower limit threshold TH1 is set to a value exceeding 20%. At this time, it is considered that the AGV 10 existing in the standby area W will be used for conveyance and will thus consume electric power. More specifically, for example, the lower limit threshold TH1 is set to a value falling within a range of 30% to 40%.

If the remaining battery amount indicated by the remaining amount information is smaller than the lower limit threshold, the management apparatus 1 transmits, in step S6, a charging instruction to the control unit 20 of the AGV 10. The control unit 20 moves the AGV 10 to the charging area E, thereby charging the battery 16. If the remaining battery amount indicated by the remaining amount information is equal to or larger than the lower limit threshold, the processing ends. After that, another AGV 10 is selected in step S1 and the same processing is repeated.

Note that in this embodiment, the management apparatus 1 determines whether the remaining amount of the battery 16 is smaller than the lower limit threshold TH1, and then determines whether to charge the battery 16. However, the control unit 20 of the AGV 10 may perform the determination processing, and spontaneously charge the battery 16 in a case where the remaining amount of the battery 16 is smaller than the lower limit threshold TH1.

Furthermore, in this embodiment, if it is determined in step S5 that the remaining battery amount indicated by the remaining amount information is smaller than the lower limit threshold, the processing in step S6 is performed, and if the remaining battery amount is equal to or larger than the lower limit threshold, the processing ends. Instead, if the remaining battery amount is equal to or smaller than the lower limit threshold, the processing in step S6 may be performed, and if the remaining battery amount is larger than the lower limit threshold, the processing may end.

Figure 6:
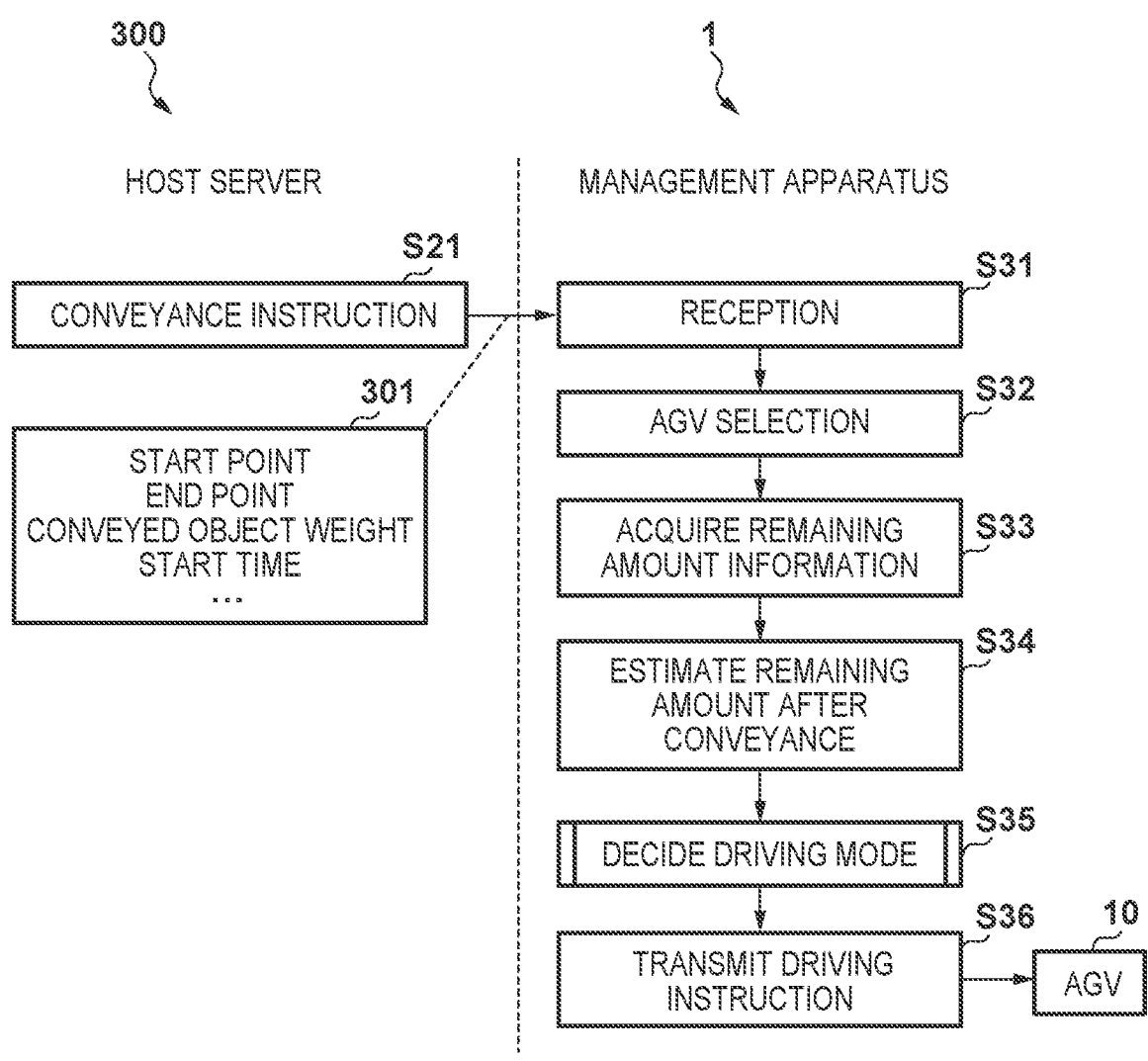
FIG. 6 is a flowchart illustrating an example of the processing of the management apparatus.

Another example of processing executed by the processing unit 2 of the management apparatus 1 will be described next. FIG. 6 shows an example of processing performed when conveying the vehicle body 200 from the start point C to the end point D. Step S21 is processing by the host server 300, and steps S31 to S35 are processes by the management apparatus 1.

In step S21, the host server 300 transmits a conveyance instruction of the vehicle body 200 to the management apparatus 1. The conveyance instruction includes a conveyance condition 301. The conveyance condition 301 includes, for example, the start point C, the end point D, a conveyed object weight (the weight of the vehicle body 200), and a conveyance start time (start time) at the start point C.

In step S31, the management apparatus 1 receives the conveyance instruction. In step S32, the management apparatus 1 selects the AGV 10 to be used for conveyance. As the AGV 10, for example, one AGV 10 that exists in the standby area W close to the start point C specified by the conveyance condition 301 is selected from the AGVs 10 registered in the AGV management DB 31. The selected AGV 10 will be referred to as the selected AGV (or selected vehicle) hereinafter. In step S33, the management apparatus 1 acquires information (remaining amount information) of the "remaining battery amount" of the selected AGV from the AGV management DB 31.

In step S34, based on the conveyance condition 301 and the remaining amount information acquired in step S33, the management apparatus 1 estimates the remaining amount of the battery 16 of the selected AGV when the vehicle body 200 is conveyed to the end point D (conveyance destination). The estimated remaining amount can be calculated from a plurality of elements. The plurality of elements include, for example, the moving distance of the selected AGV, the conveyance load (the weight of the vehicle body 200) of the selected AGV, and the moving environment (the presence/absence of a high-temperature area) of the selected AGV.

If the moving distance of the selected AGV is long, the power consumption of the motors 14a is large. Therefore, the consumption of the battery is large and the remaining battery amount after the movement is small. The moving distance includes the conveyance distance from the start point C to the end point D. The moving distance can also include the distance from the standby area W to the start point C or the distance from the end point D to the standby area W. In this embodiment, the moving distance includes the distance from the standby area W to the start point C. The moving distance can be calculated from the start point C and the end point D specified by the conveyance condition 301, and the information accumulated in the conveyance path DB 32.

If the weight of the vehicle body 200 is heavy, the power consumption of the motors 14a is large. Therefore, the consumption of the battery is large and the remaining battery amount after the movement is small. The weight of the vehicle body 200 can be specified from the conveyance condition 301. If the production facility shown in FIG. 1 is a facility in which various types of products (vehicle bodies of a plurality of vehicle models) are mixed, the weight of the vehicle body 200 may vary depending on the type of the vehicle body 200. Due to the temperature characteristic of the battery 16, the consumption of the battery is larger in a case where the selected AGV passes through the high-temperature area than in a case where the selected AGV does not pass through the high-temperature area, and the remaining battery amount after the movement is small. Whether to pass through the high-temperature area can be determined based on the start point C and the end point D specified by the conveyance condition 301 and the information accumulated in the conveyance path DB 32.

From the above viewpoint, for example, the estimated remaining amount can be calculated by:

$$\text{estimated remaining amount} = \text{current remaining amount} -$$
$$\text{moving distance coefficient} \times \text{weight coefficient} \times \text{temperature coefficient}$$

where the moving distance coefficient is a coefficient corresponding to the moving distance of the selected AGV, and has a larger value as the moving distance is longer. The weight coefficient is a coefficient corresponding to the weight of the vehicle body 200, and has a larger value as the weight is heavier. The temperature coefficient is a coefficient corresponding to whether the selected AGV passes through the high-temperature area, and has a larger value in a case where the selected AGV passes through the high-temperature area than in a case where the selected AGV does not pass through the high-temperature area.

As another example, the following equation may be used by discriminating between a moving distance in a high-temperature area and a moving distance in a normal-temperature area.

$$\text{estimated remaining amount} =$$
$$\text{current remaining amount} - \text{weight coefficient} \times$$
$$(\text{moving distance coefficient of normal-temperature area} \times$$
$$\text{temperature coefficient of normal-temperature area} +$$
$$\text{moving distance coefficient of high-temperature area} \times$$
$$\text{temperature coefficient of high-temperature area})$$

where the moving distance coefficient of the normal-temperature area is the above-described moving distance coefficient, and is a coefficient corresponding to the moving distance in an area other than the high-temperature area, and the moving distance coefficient of the high-temperature area is a coefficient corresponding to the moving distance in the high-temperature area. The temperature coefficient of the normal-temperature area has a value smaller than that of the temperature coefficient of the high-temperature area. The temperature coefficient of the high-temperature area may individually be set in accordance with the actual temperature. The calculation of the estimated remaining amount may be calculation using a machine learning result in addition to such equations.

Figure 7A:
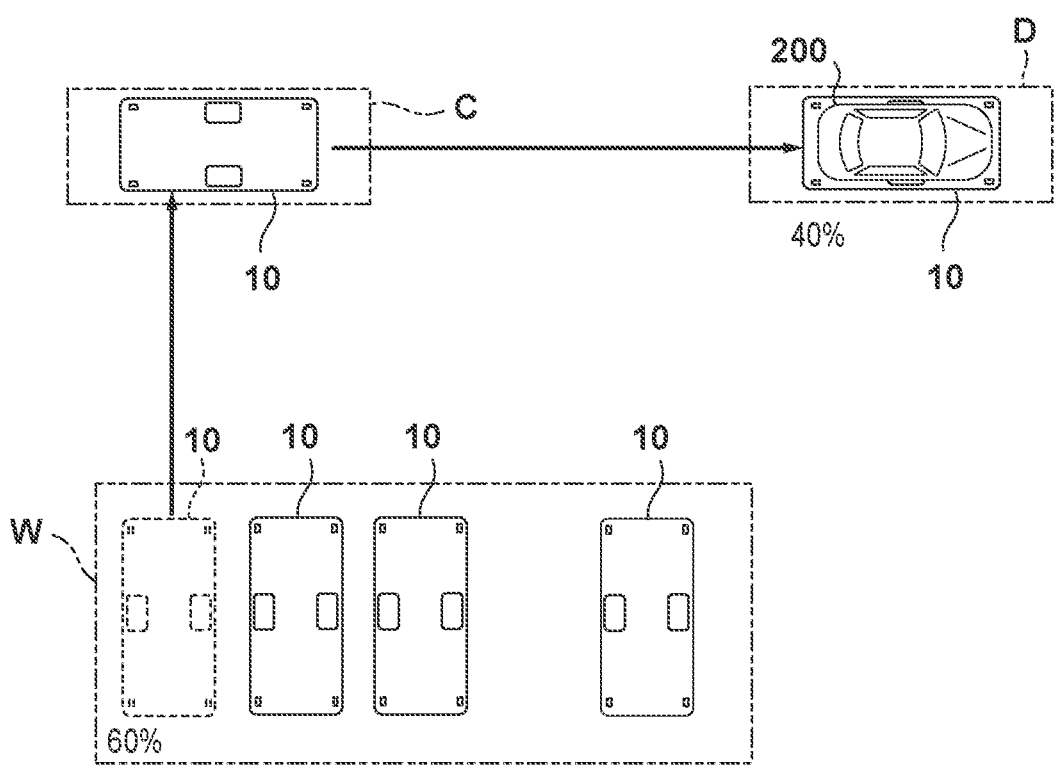
FIG. 7A is an explanatory view of remaining battery amount estimation processing.

FIG. 7A schematically shows an example of estimation of the remaining amount of the battery 16. The example shown in FIG. 7A assumes an example in which the distance from the standby area W to the start point C and the conveyance distance from the start point C to the end point D are included as the moving distance of the selected AGV. In the standby area W, the remaining amount (current remaining amount) of the battery 16 of the selected AGV 10 is 60%. After the selected AGV 10 moves from the standby area W to the start point C and reaches the end point D to complete the conveyance, the estimated remaining amount is 40%.

Next, in step S35 of FIG. 6, the management apparatus 1 decides the driving mode of the selected AGV 10 based on the remaining amount estimation result in step S34. As described above, it is known that a battery such as a lithium-ion battery is desirably maintained to have a remaining battery amount of 20% to 80%, and the life of the battery is shortened when the remaining battery amount is smaller than 20%. Even if the battery 16 of the selected AGV has a remaining amount enough to convey the vehicle body 200 from the start point C to the end point D, if the remaining amount of the battery 16 becomes smaller than 20% as a result of the conveyance, this causes the life of the battery 16 to be shortened, thereby increasing the replacement frequency. In this embodiment, the remaining amount of the battery 16 of the selected AGV is prevented from becoming smaller than 20% after conveyance, by switching the presence/absence of charging in accordance with the remaining amount estimation result.

Figure 7B:
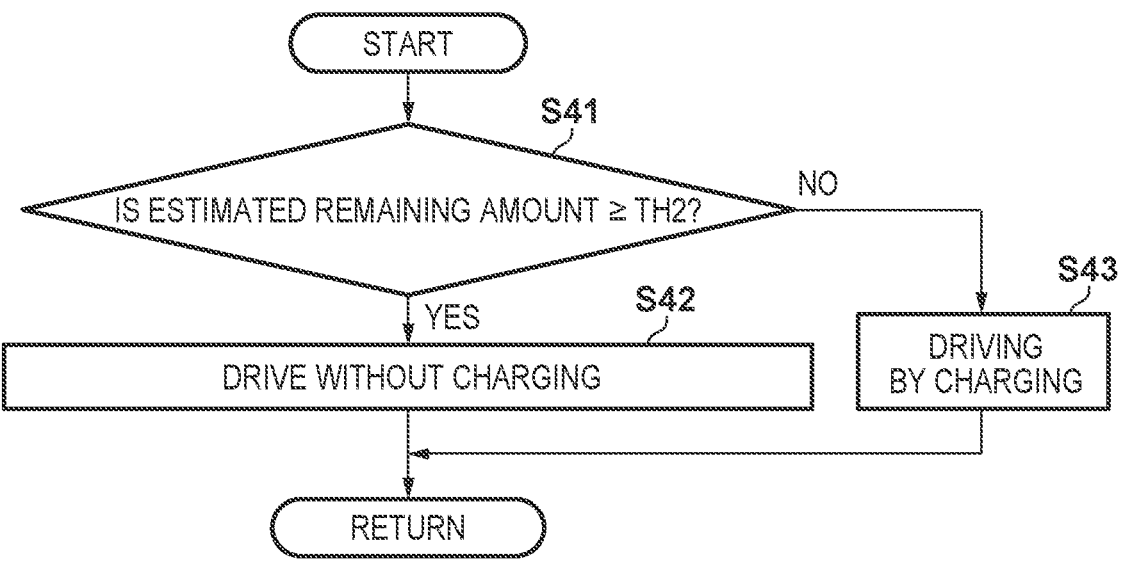
FIG. 7B is a flowchart illustrating an example of the processing of the management apparatus.

FIG. 7B is a flowchart illustrating an example of the processing in step S35. In step S41, it is determined whether the estimated remaining amount in step S34 is equal to or larger than a lower limit threshold TH2. If the estimated remaining amount is equal to or larger than the lower limit threshold TH2, the process advances to step S42; otherwise, the process advances to step S43. The lower limit threshold TH2 is set to a value exceeding 20%. More specifically, for example, the lower limit threshold TH2 is set to a value falling within a range of 23% to 35%, and may particularly be set to a value falling within a range of 25% to 30%. A relationship of TH2<TH1 may be satisfied.

Figure 8A:
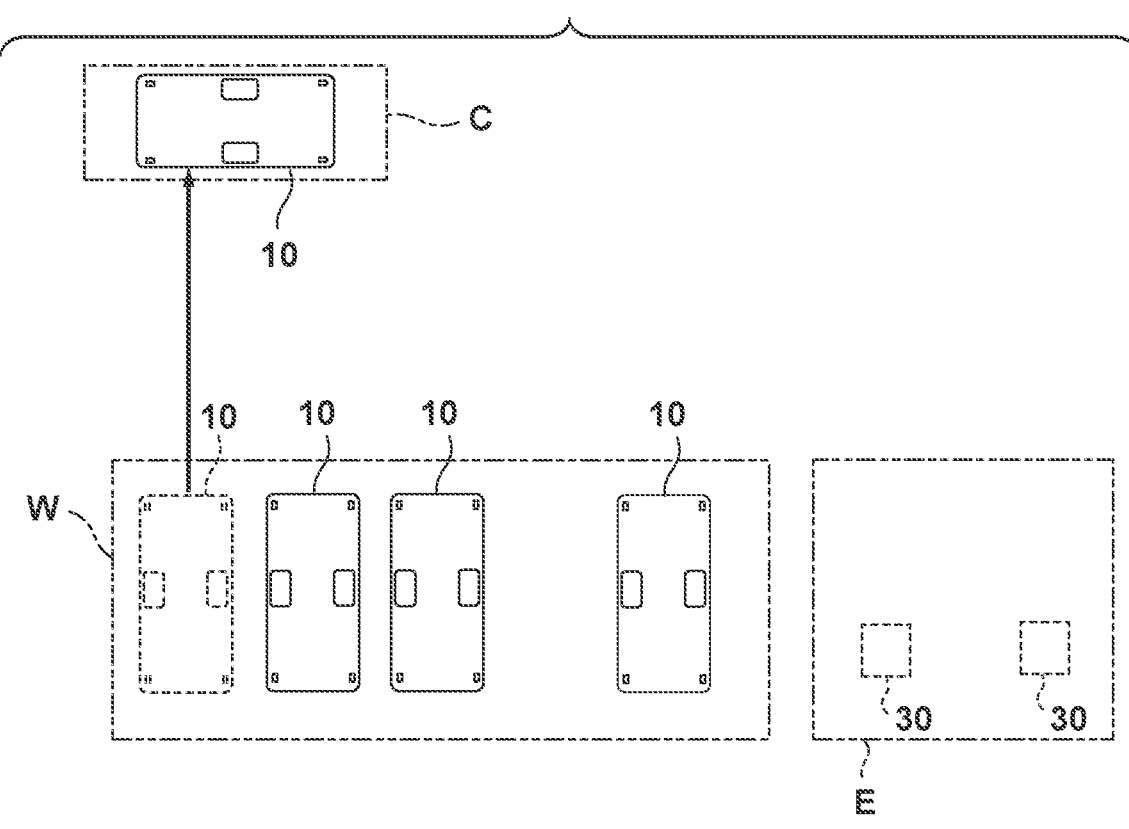
FIGS. 8A and 8B are views each showing an example of the driving mode of the automated guided vehicle.
Figure 8B:
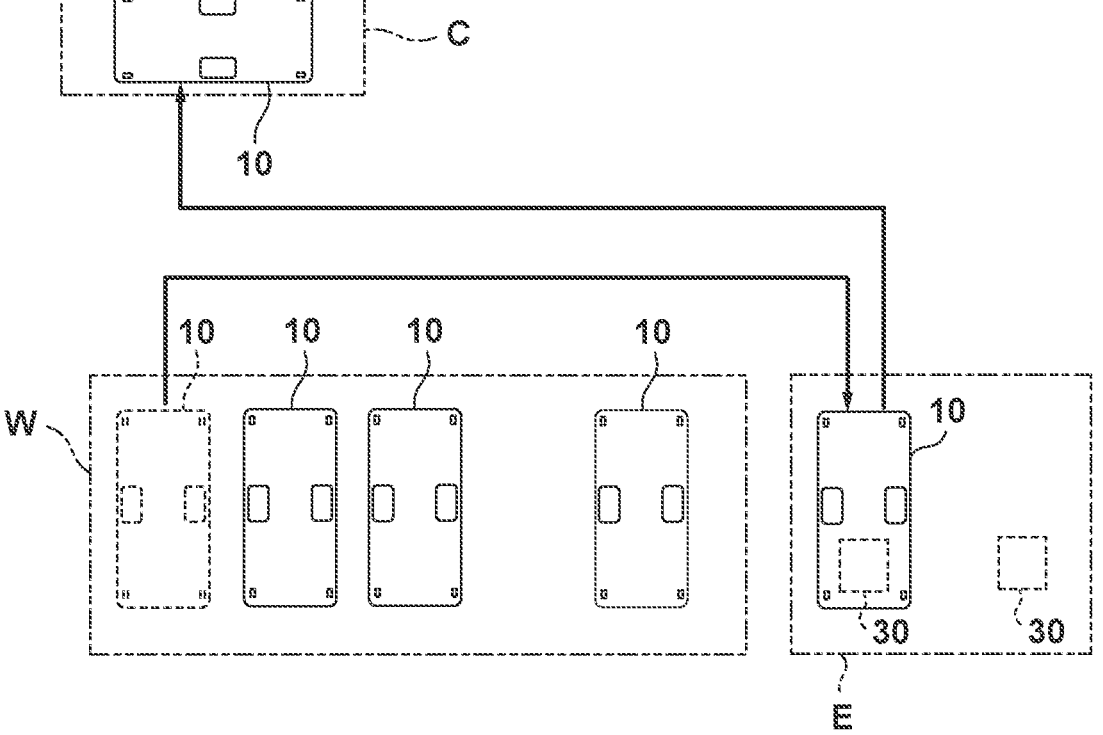

The driving mode of the selected AGV is set to "driving without charging" in step S42, and is set to "driving by charging" in step S43. FIG. 8A schematically shows the driving mode in a case of "driving without charging". The selected AGV 10 moves from the standby area W to the start point C without intervention of the charging area E, thereby conveying the vehicle body 200. FIG. 8B schematically shows the driving mode in a case of "driving by charging". The selected AGV 10 moves from the standby area W to the charging area E to charge the battery 16, and then moves to the start point C, thereby conveying the vehicle body 200. In this way, in either driving mode, it is possible to prevent the remaining amount of the battery 16 from becoming smaller than 20% after the conveyance of the vehicle body 200.

Referring back to FIG. 6, the management apparatus 1 transmits a driving instruction to the selected AGV in step S36. The driving instruction includes pieces of information of the start point C, the end point D, the start time, and the driving mode decided in step S35. Upon receiving the driving instruction, the selected AGV executes a conveyance operation in accordance with instruction contents.

Note that if it is determined in step S41 that the estimated remaining amount is equal to or smaller than the lower limit threshold TH2, the processing in step S43 may be performed, and if the estimated remaining amount is larger than the lower limit threshold TH2, the processing in step S42 may be performed.

Another Example 1 of Processing of Deciding Driving Mode

In the example shown in FIG. 7B, if the estimated remaining amount is smaller than the lower limit threshold TH2, the selected AGV is charged and used for conveyance. However, the charging may not be completed before the conveyance start time depending on a charging time. To cope with this, another AGV 10 may be selected. FIG. 9A is a flowchart illustrating an example, and is a flowchart illustrating another example of the processing in step S35.

In step S41, it is determined whether the estimated remaining amount in step S34 is equal to or larger than the lower limit threshold TH2. If the estimated remaining amount is equal to or larger than the lower limit threshold TH2, the process advances to step S44; otherwise, the process advances to step S45. The driving mode of the selected AGV is set to "driving without any change" in step S44, and the selected AGV moves from the standby area W to the start point C without intervention of the charging area E, thereby conveying the vehicle body 200.

In step S45, the driving mode of the selected AGV is set to "not driving". Subsequently, the process advances to step S46, and another AGV 10 is selected to perform the processes in steps S33 to S35 of FIG. 6. The same processing is repeated until the AGV 10 whose estimated remaining amount is equal to or larger than the lower limit threshold TH2 is selected.

Note that if it is determined in step S41 that the estimated remaining amount is equal to or smaller than the lower limit threshold TH2, the processing in step S45 may be performed, and if the estimated remaining amount is larger than the lower limit threshold TH2, the processing in step S44 may be performed.

Figure 10A:
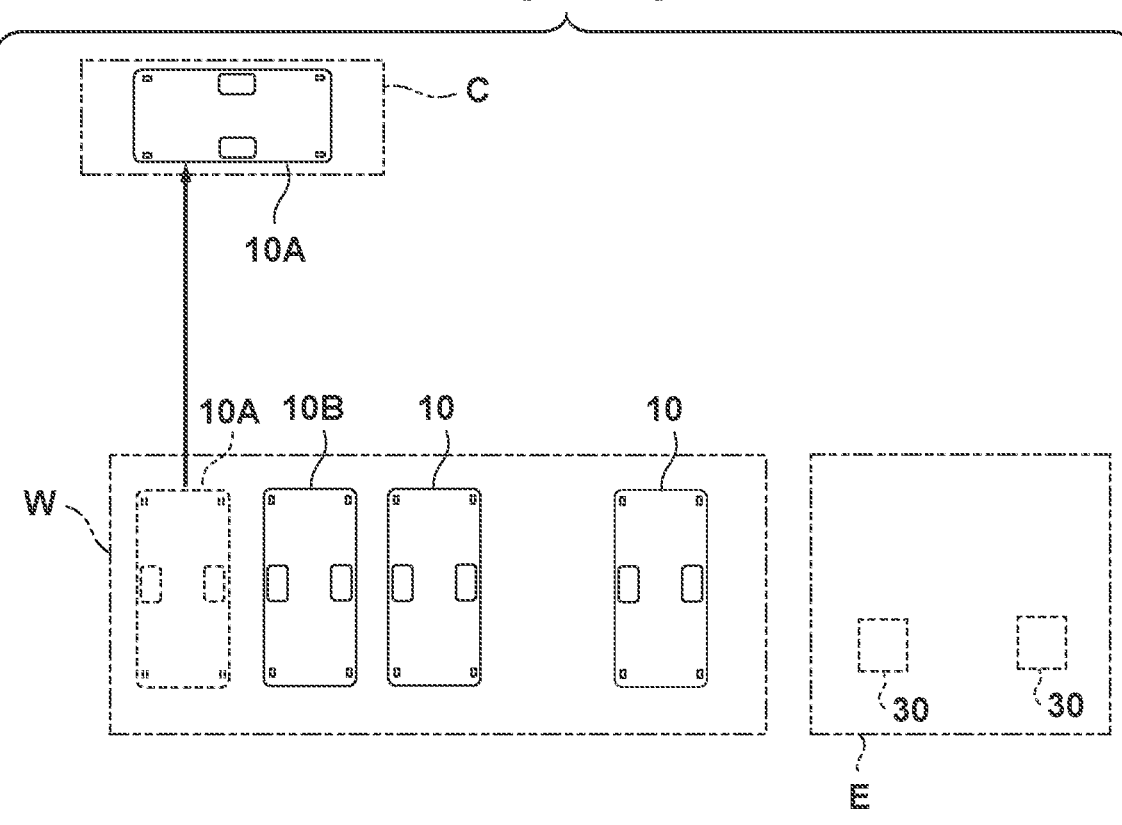
FIGS. 10A and 10B are views each showing an example of the driving mode of the automated guided vehicle.
Figure 10B:
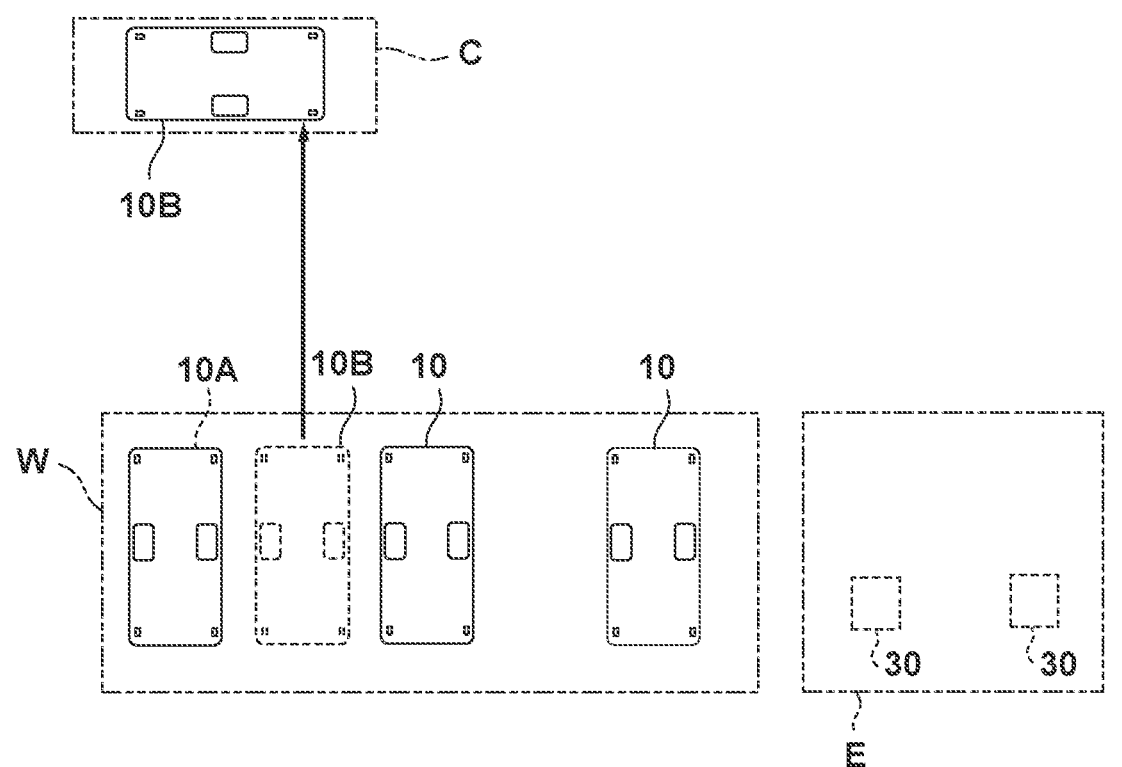

FIGS. 10A and 10B each schematically show the driving mode in this example. FIG. 10A schematically shows the driving mode in a case of "driving without any change". A selected AGV 10A moves from the standby area W to the start point C without intervention of the charging area E, thereby conveying the vehicle body 200. FIG. 10B schematically shows a case where "not driving" is set for the selected AGV 10A and "driving without any change" is set for a next selected AGV 10B. The first selected AGV 10A stands by in the standby area W. The next selected AGV 10B moves from the standby area W to the start point C without intervention of the charging area E, thereby conveying the vehicle body 200.

Another Example 2 of Processing of Deciding Driving Mode

The examples of FIGS. 7B and 9A may be combined. FIG. 9B is a flowchart illustrating an example, and is a flowchart illustrating another example of the processing in step S35.

In step S41, it is determined whether the estimated remaining amount in step S34 is equal to or larger than the lower limit threshold TH2. If the estimated remaining amount is equal to or larger than the lower limit threshold TH2, the process advances to step S42; otherwise, the process advances to step S51. In step S42, the driving mode of the selected AGV is set to "driving without charging". In this case, similar to the example shown in FIG. 8A, the selected AGV 10 moves from the standby area W to the start point C without intervention of the charging area E, thereby conveying the vehicle body 200.

In step S51, in a case where the battery 16 of the selected AGV is charged in the charging area E, it is determined, based on the estimated remaining amount and the start time of the conveyance condition 301, whether the charging is completed before the start time. If the charging is completed before the start time, the process advances to step S52; otherwise, the process advances to step S53. In step S52, the driving mode of the selected AGV is set to "driving by charging". In this case, similar to the example shown in FIG. 8B, the selected AGV 10 moves from the standby area W to the charging area E to charge the battery 16, and then moves to the start point C, thereby conveying the vehicle body 200.

In step S53, the driving mode of the selected AGV is set to "not driving". Subsequently, the process advances to step S54, and another AGV 10 is selected to perform the processes in steps S33 to S35 of FIG. 6. The same processing is repeated until the AGV 10 whose estimated remaining amount is equal to or larger than the lower limit threshold TH2 is selected. In this case, similar to the example shown in FIG. 10B, the other selected AGV whose estimated remaining amount is equal to or larger than the lower limit threshold TH2 moves from the standby area W to the start point C without intervention of the charging area E, thereby conveying the vehicle body 200.

Note that if it is determined in step S41 that the estimated remaining amount is equal to or smaller than the lower limit threshold TH2, the processing in step S51 may be performed, and if the estimated remaining amount is larger than the lower limit threshold TH2, the processing in step S42 may be performed.

Other Embodiments

The above embodiment has explained the form in which when acquiring the remaining amount information in step S33 of FIG. 6, the remaining amount information is acquired from the AGV management DB 31. However, a remaining amount detection instruction may be transmitted to the selected AGV and remaining amount information returned from the selected AGV may be acquired.

The above embodiment has explained the arrangement in which a high-temperature area where the temperature is relatively higher than in another area is provided in the production facility, and the consumption of the battery is large when the selected AGV moves in the high-temperature area. A storage area where an AGV is stored and an area, where an operator is absent, in the conveyance path of the vehicle body 200 by the AGV 10 are provided with low-temperature areas where the temperature is relatively lower than in other areas. In a case where the selected AGV passes through the low-temperature area, the consumption of the battery is larger than in a case where the selected AGV does not pass through the low-temperature area. The presence/absence of a low-temperature area as the moving environment of the selected AGV may be determined, and a temperature coefficient is set to a larger value in a case where the selected AGV passes through the low-temperature area than in a case where the selected AGV does not pass through the low-temperature area. Furthermore, in winter or in a case where the production facility is in a high-latitude area, the temperature is lower than usual. In a case where the production facility is operated at night or on a holiday, the temperature is lower than usual. In this case as well, the temperature coefficient may be set to a value larger than usual. In a case where the low-temperature area is considered, as described above, the conveyance path DB 32 shown in FIG. 4B includes information of "low-temperature area" as information for each conveyance section of one unit. With respect to the temperature in the production facility, the area may be divided into a room-temperature area, a high-temperature area, and a low-temperature area, divided into a room-temperature area and a high-temperature area, or divided into a room-temperature area and a low-temperature area.

In the above embodiment, the coating processing facility of the vehicle body of the vehicle has been exemplified as a production facility, and the vehicle body is set as a conveyance target object. However, the present invention is also applicable to another kind of production facility or conveyance target object.

While an embodiment has been described, the invention is not limited to the foregoing embodiments, and various variations/changes are possible within the spirit of the invention.

What is claimed is:

1. A management apparatus for managing driving of a plurality of automated guided vehicles that convey a conveyance target object in a production facility in which a charging area where a battery is charged is provided, comprising:

a processor and a storage device storing a program executable by the processor to perform acquiring remaining amount information of the battery, which is provided in a selected vehicle selected from the plurality of automated guided vehicles;

acquiring a conveyance condition of the conveyance target object, the conveyance condition including a condition for specifying a conveyance destination;

estimating, based on the remaining amount information and the conveyance condition, a remaining amount of the battery at a time of conveying the conveyance target object to the conveyance destination;

controlling the selected vehicle so as to convey the conveyance target object to the conveyance destination without charging the battery in the charging area in a case where the remaining amount indicated by an estimation result is larger than a threshold;

determining whether a charging is completed before a conveyance start time if charging the battery in the charging area in a case where the remaining amount indicated by the estimation result is not larger than the threshold; and controlling the selected vehicle so as to convey the conveyance target object to the conveyance destination with charging the battery in the charging area in a case where it is determined that the charging is completed before the conveyance start time.

2. The apparatus according to claim 1, wherein the conveyance condition includes a condition for specifying a conveyance source of the conveyance target object, and wherein in the estimating, a smaller remaining amount of the battery is estimated as a conveyance distance from the conveyance source to the conveyance destination is longer.

3. The apparatus according to claim 1, wherein the conveyance condition includes a condition for specifying a weight of the conveyance target object, and wherein in the estimating, a smaller remaining amount of the battery is estimated as the weight is heavier.

4. The apparatus according to claim 1, wherein a high-temperature area where a temperature is relatively high is provided in the production facility, wherein the conveyance condition includes a condition for specifying a conveyance source of the conveyance target object, and wherein in the estimating, a smaller remaining amount of the battery is estimated in a case where the high-temperature area is present in a path from the conveyance source to the conveyance destination than in a case where the high-temperature area is absent.

5. The apparatus according to claim 1, wherein a low-temperature area where a temperature is relatively low is provided in the production facility, wherein the conveyance condition includes a condition for specifying a conveyance source of the conveyance target object, and wherein in the estimating, a smaller remaining amount of the battery is estimated in a case where the low-temperature area is present in a path from the conveyance source to the conveyance destination than in a case where the low-temperature area is absent.

6. The apparatus according to claim 1, wherein in a case where the remaining amount is specified by a percentage, the threshold is a value exceeding 20%.

7. The apparatus according to claim 1, wherein the production facility is a facility concerning coating processing of a vehicle body, and wherein the conveyance target object is the vehicle body.

8. A management method of managing driving of a plurality of automated guided vehicles that convey a conveyance target object in a production facility by a management apparatus which is capable of communicating with the plurality of automated guided vehicles, the method comprising:

acquiring remaining amount information of a battery provided in a selected vehicle selected from the plurality of automated guided vehicles;

acquiring a conveyance condition of the conveyance target object, the conveyance condition including a condition for specifying a conveyance destination;

estimating, based on the remaining amount information and the conveyance condition, a remaining amount of the battery at a time of conveying the conveyance target object to the conveyance destination;

controlling the selected vehicle so as to convey the conveyance target object to the conveyance destination without charging the battery in a charging area in a case where the remaining amount indicated by an estimation result is larger than a threshold;

determining whether a charging is completed before a conveyance start time if charging the battery in the charging area in a case where the remaining amount indicated by the estimation result is not larger than the threshold; and controlling the selected vehicle so as to convey the conveyance target object to the conveyance destination with charging the battery in the charging area in a case where it is determined that the charging is completed before the conveyance start time.

9. A coating processing facility of a vehicle body of a vehicle, comprising:

a plurality of automated guided vehicles configured to convey the vehicle body;

a plurality of work areas including at least a charging area, a coating area, and a drying area; and a management apparatus including at least one processor and at least one storage device, and configured to monitor driving of the plurality of automated guided vehicles, the management apparatus being configured to perform:

acquiring remaining amount information of a battery provided in a selected vehicle selected from the plurality of automated guided vehicles;

acquiring a conveyance condition of the vehicle body, the conveyance condition including a condition for specifying a conveyance destination;

estimating, based on the remaining amount information and the conveyance condition, a remaining amount of the battery at a time of conveying the vehicle body to the conveyance destination;

controlling the selected vehicle so as to convey the vehicle body to the conveyance destination without charging the battery in the charging area in a case where the remaining amount indicated by an estimation result is larger than a threshold;

determining whether a charging is completed before a conveyance start time if charging the battery in the charging area in a case where the remaining amount indicated by the estimation result is not larger than the threshold; and controlling the selected vehicle so as to convey the vehicle body to the conveyance destination with charging the battery in the charging area in a case where it is determined that the charging is completed before the conveyance start time.

10. The apparatus according to claim 1, wherein the program is executable by the processor to perform deciding that the conveyance target object is not conveyed by the selected vehicle in a case where it is determined that the charging is not completed before the conveyance start time.

11. The apparatus according to claim 1, wherein the program is executable by the processor to perform:

acquiring remaining amount information of a battery provided in another vehicle selected from the plurality of automated guided vehicles in a case where it is determined that the charging is not completed before the conveyance start time; and estimating, based on the remaining amount information for the another vehicle and the conveyance condition, a remaining amount of the battery of the another vehicle at a time of conveying the conveyance target object to the conveyance destination.

12. The apparatus according to claim 11, wherein the program is executable by the processor to perform controlling the another vehicle so as to convey the conveyance target object to the conveyance destination in a case where the remaining amount of the battery of the another vehicle, indicated by an estimation result, is larger than the threshold.

* * * * *